United States Patent [19]

Twibell et al.

[11] 4,390,943
[45] Jun. 28, 1983

[54] INTERFACE APPARATUS FOR DATA TRANSFER THROUGH AN INPUT/OUTPUT MULTIPLEXER FROM PLURAL CPU SUBSYSTEMS TO PERIPHERAL SUBSYSTEMS

[75] Inventors: Jerome J. Twibell; Knute S. Crawford, both of Phoenix, Ariz.

[73] Assignee: Honeywell Information Systems Inc., Phoenix, Ariz.

[21] Appl. No.: 106,779

[22] Filed: Dec. 26, 1979

[51] Int. Cl.³ .............. G06F 3/00; G06F 13/00; G06F 15/16
[52] U.S. Cl. .................................................. 364/200
[58] Field of Search ... 364/200 MS File, 900 MS File; 370/16, 112, 113; 179/18 ES, 18 EA; 307/64, 65

[56] References Cited

U.S. PATENT DOCUMENTS

| | | | |
|---|---|---|---|
| 3,576,398 | 4/1971 | De Jean et al. | 179/18 EA |
| 3,668,649 | 6/1972 | Pedersen et al. | 364/200 |
| 3,787,818 | 1/1974 | Arnold et al. | 364/200 |
| 3,962,552 | 6/1976 | Reines et al. | 179/18 EA |
| 3,999,162 | 12/1976 | Le Roy | 364/900 |
| 4,049,906 | 9/1977 | Hafner et al. | 179/18 EA |
| 4,075,693 | 2/1978 | Fox et al. | 364/200 |
| 4,081,612 | 3/1978 | Hafner | 179/18 EA |
| 4,130,864 | 12/1978 | Schlotterer | 364/200 |
| 4,181,940 | 1/1980 | Underwood et al. | 364/200 |
| 4,191,997 | 3/1980 | Luiz | 364/200 |
| 4,204,251 | 5/1980 | Brudevold | 364/200 |
| 4,207,609 | 6/1980 | Luiz et al. | 364/200 |
| 4,322,795 | 3/1982 | Lange et al. | 364/200 |

*Primary Examiner*—James D. Thomas
*Assistant Examiner*—Archie E. Williams, Jr.
*Attorney, Agent, or Firm*—William W. Holloway, Jr.; L. J. Marhoefer; N. Prasinos

[57] ABSTRACT

In a data processing unit, apparatus permits more than one central processing unit and associated control interface unit to transfer data to an input/output multiplexer. Thus, more than one central processing unit can have access to a peripheral subsystem. Apparatus is provided which causes the input/output multiplexer to receive sets of data signal groups from the control interface units in sequential order. A signal-free period null signal period is provided by the control unit interface between each set of data signal groups (e.g., each data signal group set includes a single processor sequence). The signal-free period allows the input/output multiplexer to accept waiting data signals from the next sequential control interface unit. Once begun, the transfer of the entire set of data signal groups will proceed without interruption.

9 Claims, 6 Drawing Figures

CLOCK CYCLE 1  NO ACTIVITY

CLOCK CYCLE 2  CENTRAL SUBSYSTEM 4 READY TO TRANSFER A(1-1)
CENTRAL SUBSYSTEM 5 READY TO TRANSFER B(1-1)

CLOCK CYCLE 3  TRANSFER REGISTER 51 CONTAINS A(1-1)
TRANSFER REGISTER 52 CONTAINS B(1-1)
HOLD SIGNAL SENT TO CENTRAL SUBSYSTEM 5

CLOCK CYCLE 4  CENTRAL SUBSYSTEM READY TO TRANSFER A(2-1)
TRANSFER REGISTER 52 CONTAINS B(1-1)
INPUT REGISTER 55 CONTAINS A(1-1)

CLOCK CYCLE 5  CENTRAL SUBSYSTEM 5 READY TO TRANSFER B(2-1)
TRANSFER REGISTER 51 CONTAINS A(2-1)
INPUT REGISTER 55 CONTAINS B(1-1)

CLOCK CYCLE 6  CENTRAL SUBSYSTEM 4 READY TO TRANSFER A(3-1)
TRANSFER REGISTER 52 CONTAINS B(2-1)
INPUT REGISTER 55 CONTAINS A(2-1)

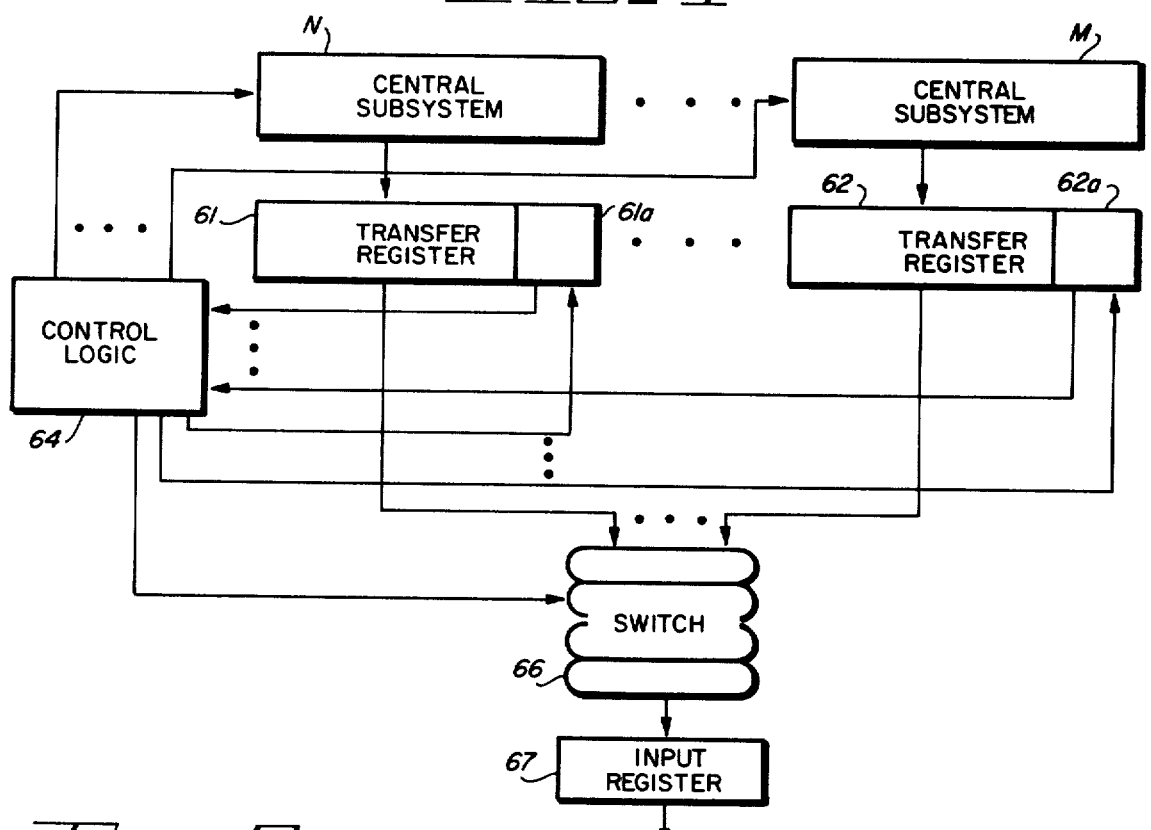

FIG-4

FIG-5 they may be grouped differently or otherwise designated.

INTERFACE APPARATUS FOR DATA TRANSFER THROUGH AN INPUT/OUTPUT MULTIPLEXER FROM PLURAL CPU SUBSYSTEMS TO PERIPHERAL SUBSYSTEMS

BACKGROUND OF THE INVENTION

1. Field of the Invention

This invention relates generally to data processing systems and more particularly to data processing systems in which peripheral subsystems are to be made available to more than one central processing unit and associated equipment. Apparatus is provided in the input/output multiplexer which permits the efficient transfer of information between more than one control interface units and the plurality of peripheral subsystems coupled to the input/output multiplexer.

2. Description of the Prior Art

It is generally known in the prior art to utilize an input/output multiplexer to provide an interface between the control interface unit of a data processing system and the peripheral subsystem. In the prior art, a peripheral subsystem will be available only to a single central processing unit. In the event that access to an input/output multiplexer and therefore to the associated peripheral subsystem by several control unit interfaces was desired, it was necessary to provide elaborate availability and decision-making apparatus to control the interchange of data signals. Features which have been considered in the design of such an interface include the present activity in the input/output multiplexer, priority of requests, period of waiting for transfer, etc.

It is therefore an object of the present invention to provide an improved data processing unit.

It is another object of the present invention to permit more than one central processing unit to have access to a peripheral subsystem.

It is a more particular object of the present invention to provide apparatus allowing more than one control interface unit to transfer data signals through the input part of an input/output multiplexer.

It is a still more particular object of the present invention to permit the transfer of data through the input part of an input/output multiplexer by alternating the availability of the input/output multiplexer to each of a plurality of control interface units.

SUMMARY OF THE INVENTION

The aforementioned and other objects of the present invention are accomplished by providing a plurality of transfer registers in the input part of an input/output multiplexer, such that each transfer register is dedicated to (and receives data signals from) an associated one of a like plurality of control interface units. A status signal bit signal is provided with each transfer register. The status signals indicate to the input/output multiplexer control logic apparatus that a data signal group is waiting for transfer into the multiplexer input register. When the input/output multiplexer input register is available, the data signal group is transferred into it (from a transfer register) through a controllable switch. The status signal bit signal insures that sets of related signal groups are transferred sequentially. After completing a transfer of related data signals to its associated transfer register in the multiplexer, a control interface unit delays one clock cycle before entering an unrelated data signal group in the transfer register. During the one clock period between sets of data signal groups, the "register full" signal from the transfer register being applied to the control logic 54 will be removed. The control logic will then remove the "hold" signal being applied to the next control interface unit in sequence, and permit the waiting data signal group set to be transferred to the input/output multiplexer.

These and other features will become apparent from reading the following description along with the drawings.

BRIEF DESCRIPTION OF THE DRAWINGS

FIG. 4 provides a narrative description of data transfer activity during the first 6 clock cycles of FIG. 3.

FIG. 5 is a schematic diagram of apparatus controlling the data signal group transfer between an input/output multiplexer and a multiplicity of central subsystems.

DESCRIPTION OF THE PREFERRED EMBODIMENT

Detailed Description of the Figures

Figure 1:
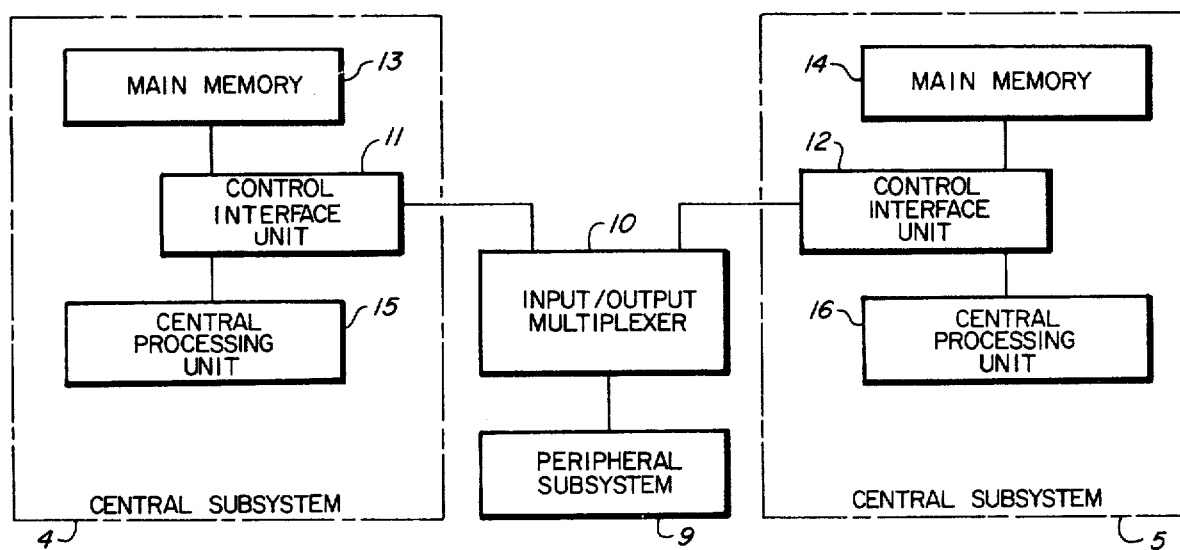
FIG. 1 is a schematic diagram of a general purpose data processing system.

Referring to FIG. 1, a schematic diagram of a data processing system comprising two central subsystems and at least one shared peripheral subsystem is shown. Central processing unit 15 is coupled to control interface unit 11 and the control interface unit 11 are coupled to main memory 13 and input/output multiplexer 10. Control interface unit 12 is coupled to central processing unit 16, main memory 14 and to input/output multiplexer 10. Input/output multiplexer 10 is coupled to the shared peripheral subsystem 9. In the present invention, it is necessary that only one of the peripheral subsystems be activated. The essential data processing functions are performed in a central processing unit, the main memory contains the data needed by the central processing unit, and the control interface unit controls the data transfer to the central processing unit. A central subsystem is composed of these functional units, although they may be grouped differently or otherwise designated.

Figure 2:
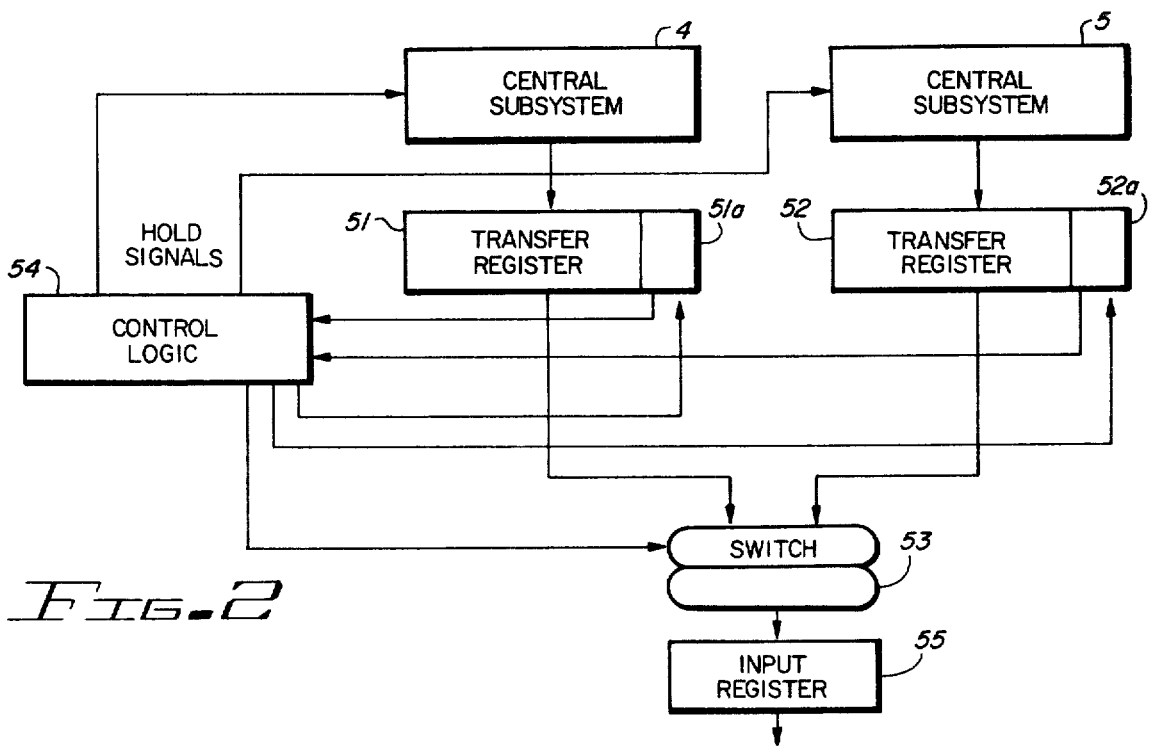
FIG. 2 is a schematic diagram of the apparatus controlling the interface between an input/output multiplexer and two central subsystems.

Referring to FIG. 2, apparatus in the central subsystem 4 is coupled to transfer register 51, while apparatus in the central subsystem 5 is coupled to transfer register 52. Register 51 and register 52 are in turn coupled through switch 53 to the input/output multiplexer input register 55. Register 51 and register 52 are in turn coupled to control logic 54. More specifically, a transfer register component 51a and a transfer register component 52a are coupled to control logic 54 and each transfer register component applies a signal to control logic 54 when the associated registers have data signal groups stored therein. Control logic 54 is coupled to central subsystem 4 and central subsystem 5 for providing signals inhibiting transfer of data signals to register 51 and register 52, respectively.

Figure 3:
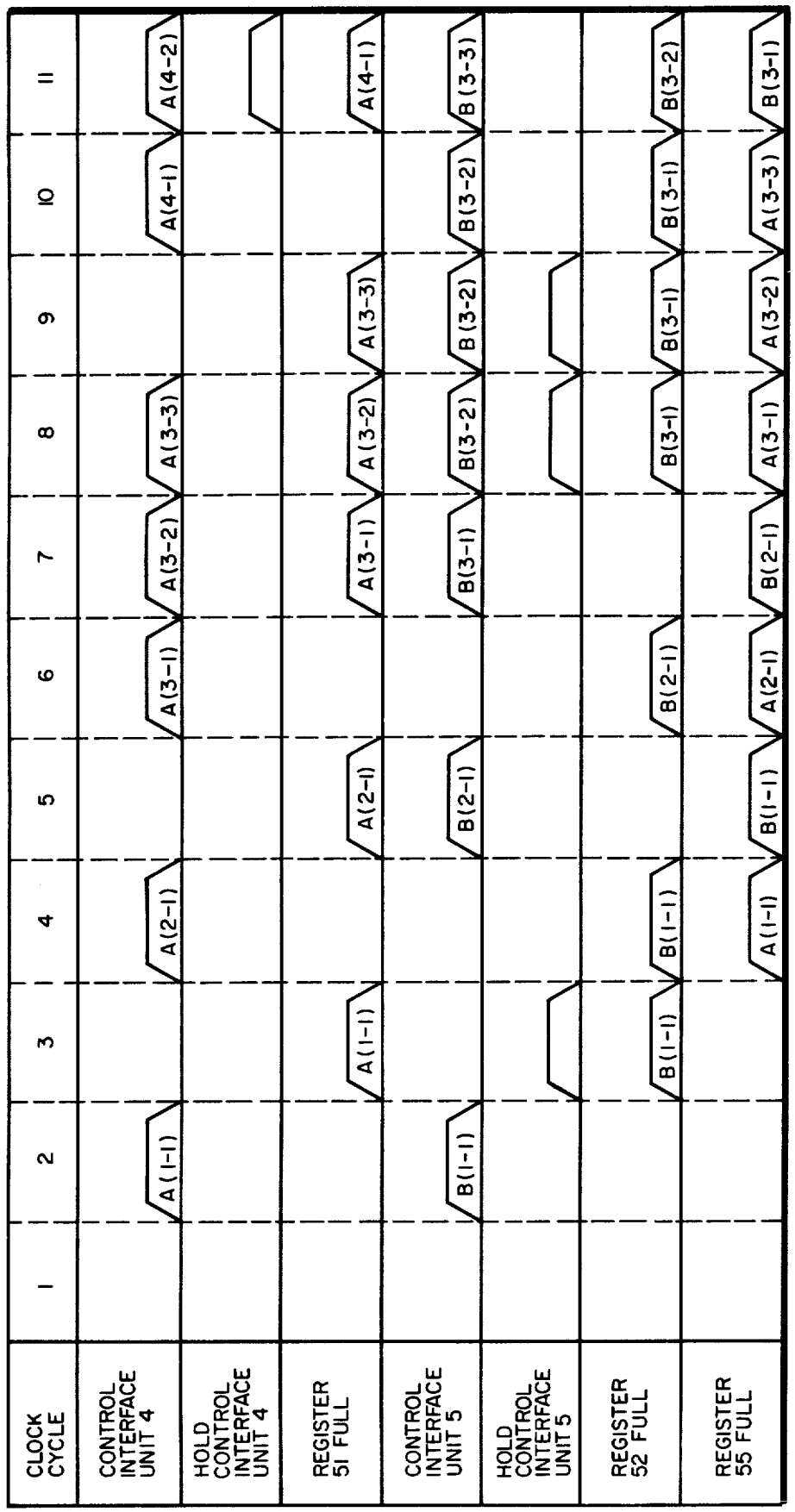
FIG. 3 is a timing diagram illustrating the transfer of data signals as a function of time from the control interface units to the input/output multiplexer.

Referring to FIG. 3, a diagram is shown of the movement of the data signals from central subsystem 4 and central subsystem 5 to register 55 in the input/output multiplexer. These signals are shown in relationship to the clock cycles and indicate the status of the various registers.

Referring to FIG. 4, the transfer of data signal groups during the first six clock cycles of FIG. 3 is described. Data groups from central subsystem 4 are labelled A, while data groups from central subsystem 5 are labelled B. The numbers associated with A and B describe the number of the data group set and the data group number, i.e., (3-4) would indicate the fourth group member of the third set of data groups to be transferred.

Referring next to FIG. 5, the apparatus for providing an interface for a single input/output multiplexer with a multiplicity of central subsystems is shown. Each of the multiplicity of central subsystems N through M is coupled to transfer register 61 through transfer register 62 respectively. Each transfer register is coupled through a switch 66 to an input register 67. The switch position addressing register 67 is determined by signals from control logic 64. Control logic 64 is in turn coupled to bit positions of 61a of register 61 through bit positions 62a of register 62. Control logic 64 is also coupled to each control interface unit for providing a hold signal to each unit under appropriate conditions.

Figure 6:
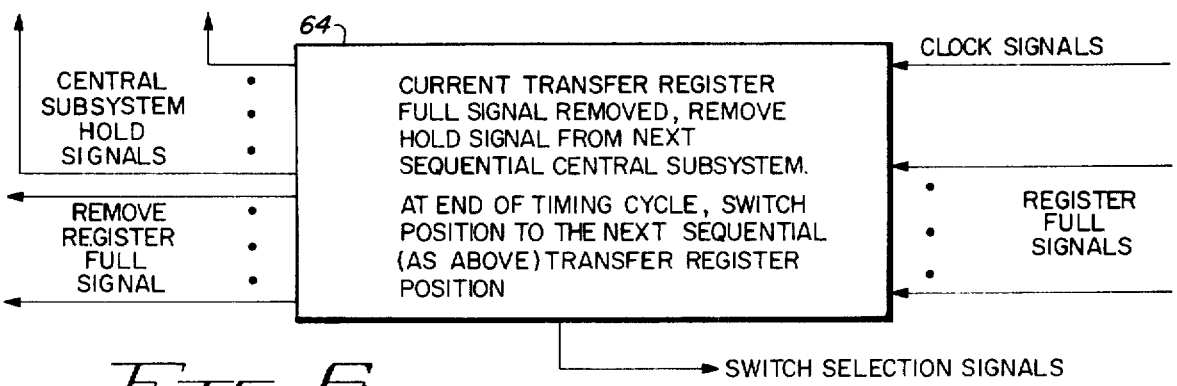
FIG. 6 is a schematic diagram of the control logic needed for an input/output multiplexer.

Referring next to FIG. 6, a diagram of the signals applied to and developed by control logic 64 is shown. Clock signals and signals from register 61 through register 62 are applied to control logic 64 when these registers contain data signal groups to be transferred to register 55. Control logic 64 applies position selection signals to switch 66 and applies hold signals to the control interface units in response to "register full" signals and the sequential register ordering.

Operation of the Preferred Embodiment

For the data processing system, an important criteria for the transfer of information from the central subsystem to the input/output multiplexer is to provide a data input register (register 55 in FIG. 2 and register 67 in FIG. 5) with updated data signal groups during each clock cycle insofar as this is possible. In an effort to maximize this criteria, while minimizing the complexity of the implementing apparatus, the present invention requires that each central subsystem, i.e., the associated control interface unit provide a one clock cycle separation between the application of independent data signal groups to the input/output multiplexer transfer register associated with each central system. A set of data signal groups, associated with a single peripheral subsystem transfer, will be applied to the interface register without a timing cycle separation. That is, the central subsystem does not provide a separation between members of a data signal group set, but rather provides a one clock cycle timing separation between each of the sets of data signal groups.

Referring to FIG. 2, the apparatus coupling the input-/output multiplexer 10 to the central subsystems 4 and 5 is shown in detail. Transfer register 51 and transfer register 52 each contain a register cell which provides a "register full" signal when the register receives a data signal group and for as long as the data signal group remains in the register. The register full cells, 51a and 52a, are coupled to control logic 54 and apply logic signals to the control logic 54 as long as a group of data signals are held in the transfer register in preparation for transfer to input register 55. The "register full" signals as well as the clock signals from the data processing system provide signals to control logic 54. Control logic 54 applies signals to switch 53 which determine. The control signals select a switch position and consequently transfer register contents will be applied to the input register 55. Control logic 54 also applies appropriate (hold) signals to the control interface units to prevent data signal groups still waiting for transfer to switch 53 from over-writing data signal groups in the transfer register. The control logic 54, based on the switch 53 address, removes the "register full" signal from the transfer register currently applying data to input register 55. As a data group is entered in the transfer register, the "register full" signal will be reset.

With reference next to FIG. 2 and FIG. 3, sample transfers of data signal group sets are illustrated. Beginning with clock cycle 1, FIG. 3 indicates that no signal group sets currently are to be transferred from either control interface unit associated with central subsystem 4 or control interface unit associated with central subsystem 5. During clock cycle 2, data signal groups from central subsystem 4, A(1-1), and central subsystem 5, B(1-1), are applied to the transfer registers 51 and 52. During clock cycle 3, signal group A(1-1) is applied into register 51 and a register full signal from cell 51a is applied to control logic 54. Concurrently, signal group B(1-1) is entered into register 52 and a register full signal from cell 52a is applied to control logic 54. In the event of simultaneous "register full" signals, the contents of register 51 are shown in FIG. 3 to have initial priority and will be transferred to register 55 during the clock cycle 4. In the preferred embodiment, one central system is given a higher priority by means of logical manipulation of the two "register-full" signals, however, the determination of the first control interface unit to transfer data signal groups can be performed at random. Control logic 54 activates the switch associated with register 51 and issues a hold signal to the central subsystem 5 coupled to register 52. The hold signal prohibits further data from being applied to register 52.

The example chosen in FIG. 3 indicates that signal group sets A(1-1) and B(1-1) are single member sets. Because the central subsystems separate individual sets of data signal groups by one clock cycle, during clock cycle 4, register 51 will not receive the first number of the next data signal group set during clock cycle 3 even if the data group is available for transfer at that time. The hold signal for register 52 is removed and the "register full" signal from cell 52a is still applied to control logic 54. During clock cycle 5, the contents of register 52 are applied through switch 53 to register 55 under control of control logic 54.

Signal group A(2-1), applied to the central subsystem output circuits during clock cycle 4, will be transferred to register 51 during clock cycle 5 and transferred to register 55 during clock cycle 6.

Beginning with clock cycle 6, an example of a multi-group set A(3-1), A(3-2), A(3-3) is shown. Because the data signal groups of the set are not separated as the groups are transferred to register 51, cell 51a the "register full" signal for 51 is being continually reimposed. Control logic 54 continues to activate switch 53 so that the contents of register 51 are transferred in sequence to register 55. During this transfer, the hold signal is continuously applied to the central subsystem 5 coupled to register 52, thereby preventing the data signals from being over-written in register 52.

Referring to FIG. 4, the activity developed during certain clock cycles of FIG. 3 are shown for the initial six clock cycles. FIG. 4 describes the material summarized in FIG. 3.

It will thus be clear, that by separating sets of data signal groups, an opportunity is provided with relatively simple apparatus to alternate access to the input/output multiplexer between two control interface units.

The present apparatus is least efficient when a single central subsystem is issuing sets of single data signal groups. In that case the efficiency could be 50%. However, when the single data signal group sets are an exception, as is true in a typical data transfer, the efficiency of transfer will be increased. In addition, the activity of the other central subsystem will also increase the efficiency.

Referring to FIG. 5, the schematic diagram extension of the two central subsystems configuration to the configuration in which a multiplicity of central subsystems are coupled to a single input/output multiplexer is illustrated. Switch 63 now has as many positions as there are central subsystems and, consequently transfer registers in the input/output multiplexer.

Referring next to FIG. 6, the additional functionality needed for the control logic 64 of the apparatus in FIG. 5 to implement the multi-central subsystem configuration is described. In particular, the complication of multiple central subsystems, as opposed to two central subsystems, requires that apparatus be provided identifying the next register, in a predetermined sequence, that has a "register full" signal from the associated register cell applied to the control logic 64. This next sequential "full" register is then applied to register 67 as well as succeeding members, if any, of the same set of data signal groups.

Control logic 67 must also re-apply a hold signal to the central subsystem from which data has already been transferred if a data signal group set is, after the one cycle, applied to the register. The transfer of data group set from this central subsystem must await the addressing of the switch position associated with this central subsystem. The addressing will be determined by sequential order of the central processing units and by the "register full" signals applied to the control logic 64.

The above description is intended to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a data processing system in which a plurality of central processing unit subsystems transmit data signal groups to peripheral subsystems through a single input/output multiplexer, wherein processing unit data signal groups are applied to output terminals of each central processing unit subsystem, a set of said data signal groups from a particular central processing unit subsystem being separated by at least one system timing cycle from each other set of data signal groups from said particular subsystem, apparatus in said input/output multiplexer for receiving data signal groups from said plurality of said central subsystems comprising:

a plurality of transfer registers, one coupled to each of said central processing unit subsystems, each of said transfer registers including an indicating register cell indicating the presence of a data signal group awaiting transfer from said coupled transfer register;

a switch means coupled to said transfer registers;

an input register coupled to said switch means for receiving each data signal group applied to said input/output multiplexer during a current system timing cycle; and control means adapted to receive signals from all of said indicating register cells, said control means also adapted to receive system timing signals, wherein said control means determines a current transfer register of said transfer registers through which data signal groups can be transferred during said current system timing cycle by means of address signals applied to said switch means, said address signals determined by said register cell contents, wherein a new current transfer register can be determined by said control means during a one of said separations between said sets of data groups.

2. The apparatus of claim 1 wherein the number of said central subsystems coupled to said input/output multiplexer is two.

3. The apparatus of claim 1 wherein said control means is coupled to each the of central subsystems.

4. In a data processing system in which a plurality of central processing unit subsystems transfers data signal groups to a plurality of peripheral subsystems via an input/output multiplexer, said data processing unit having a system clock determining system periods of predetermined duration apparatus in said input/output multiplexer for controlling transfer of said data signal groups comprising:

first register means for distributing said data signal groups in said input/output multiplexer;

switch means coupled to said first register means;

a plurality of second register means for temporary storage of said data signal groups, each of said second register means being coupled to said switch means, each of said second register means including an associated indicator means identifying a presence of a data signal group in said associated second register means; said indicator means activated by entry of a data signal group in said associated second register means, each of said second register means coupled to a one of said plurality of central processing unit subsystems; and control means coupled to said switch means, said indicator means and said system clock, said control means controlling which of said second register means is coupled to said first register means in response to said system clock and said indicator means, wherein said associated central processing unit subsystem provides at least one null signal period of said system periods between sets of data groups said control means causing said switch means to couple a new second register means to said first register means during said null signal period between sets of said data signal groups for data signal groups currently being transferred and when a data group is in said new second register.

5. The apparatus of claim 4 wherein said control means is coupled to all of said central processing unit subsystems, said control means providing signals to each of said central processing unit subsystems prohibiting application of additional data signal groups to second register means associated with each of said central processing unit subsystems in response to predetermined clock signals and indicator means signals.

6. In a data processing system having a system clock for producing system periods of predetermined duration and in which a plurality of central subsystems have an interface with peripheral subsystems through an input/output multiplexer; wherein sets of related data signal groups are separated by at least one system null signal period from unrelated data signal groups, apparatus for transferring data signal groups from said central subsystem to said input/output multiplexer comprising:

output means associated with each central processing unit subsystem for applying data signal groups to an input terminal of each input/output multiplexer; wherein members of different sets of data signal groups are not applied to said output terminal during consecutive system periods;

transfer registers in said input/output multiplexer coupled to said output terminals, each central subsystem having an associated transfer register, said transfer registers having associated indicator means, said indicator means activated when a data signal group is entered in said associated transfer register;

input means for applying data signal groups to a remainder of said input/output multiplexer;

switch means coupled to said transfer registers and to said input means; and control means coupled to said indicator means, to said system clock and to said switch; said control means applying signals to said switch controlling when transfer register contents are coupled to said input means in response to said system clock signals and indicator means contents a new transfer register being activated only during one of said at least one null signal periods in said transfer register currently coupled to said input means.

7. The apparatus of claim 6 wherein said control means can cause coupling to said input means to be switched from a first transfer register to a second transfer register at the end of transmission of a computer data set by said first transfer register.

8. The apparatus of claim 7 wherein said control means is coupled to said output means for prevention of the application of signal groups to said output terminals when a data signal group awaiting transfer is in said associated transfer register.

9. The apparatus of claim 6 wherein said control means is coupled to said indicator means, said control means altering said indicator means contents when a data signal group in said associated transfer register is transferred to said input means.

* * * * *